United States Patent
Meinke et al.

(10) Patent No.: US 11,619,725 B1
(45) Date of Patent: Apr. 4, 2023

(54) METHOD AND DEVICE FOR THE RECOGNITION OF BLOOMING IN A LIDAR MEASUREMENT

(71) Applicant: MERCEDES-BENZ GROUP AG, Stuttgart (DE)

(72) Inventors: Martin Meinke, Hildrizhausen (DE); David Peter, Stuttgart (DE); Sebastian Buck, Böblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/920,071

(22) PCT Filed: Mar. 31, 2021

(86) PCT No.: PCT/EP2021/058407
§ 371 (c)(1),
(2) Date: Oct. 20, 2022

(87) PCT Pub. No.: WO2021/213788
PCT Pub. Date: Oct. 28, 2021

(30) Foreign Application Priority Data

Apr. 21, 2020 (DE) .................. 10 2020 110 809.5

(51) Int. Cl.
*G01C 3/08* (2006.01)
*G01S 7/497* (2006.01)
*G01S 17/931* (2020.01)
*G01S 17/48* (2006.01)

(52) U.S. Cl.
CPC .............. *G01S 7/497* (2013.01); *G01S 17/48* (2013.01); *G01S 17/931* (2020.01)

(58) Field of Classification Search
None
See application file for complete search history.

(56) References Cited

U.S. PATENT DOCUMENTS

| 2019/0391270 A1 | 12/2019 | Uehara |
| 2020/0064452 A1* | 2/2020 | Avlas ................... G01S 7/4804 |
| 2021/0183016 A1* | 6/2021 | Toyoura ................ G01S 17/894 |

FOREIGN PATENT DOCUMENTS

| DE | 102005003970 A1 | 8/2006 |
| DE | 102018003593 A1 | 10/2018 |
| EP | 3550329 A1 | 10/2019 |

OTHER PUBLICATIONS

International Search Report and Written Opinion dated Jun. 14, 2021 in related/corresponding International Application No. PCT/EP2021/058407.
Office Action dated Feb. 1, 2021 in related/corresponding DE Application No. 10 2020 110 809.5.

* cited by examiner

*Primary Examiner* — Mark Hellner
(74) *Attorney, Agent, or Firm* — Patent Portfolio Builders PLLC

(57) ABSTRACT

Blooming in a lidar measurement is recognized using a distance from a lidar reflection point determined in an active measurement and a passive measurement. A first distance value is determined in the active measurement, based on a signal duration of a laser pulse, and a second distance value is determined in the passive measurement, based on a triangulation of two-dimensional intensity measurements carried out from different measuring positions. Blooming is identified when the second distance value exceeds the first distance value by a pre-determined amount.

7 Claims, 3 Drawing Sheets

METHOD AND DEVICE FOR THE RECOGNITION OF BLOOMING IN A LIDAR MEASUREMENT

BACKGROUND AND SUMMARY OF THE INVENTION

Figure 1:
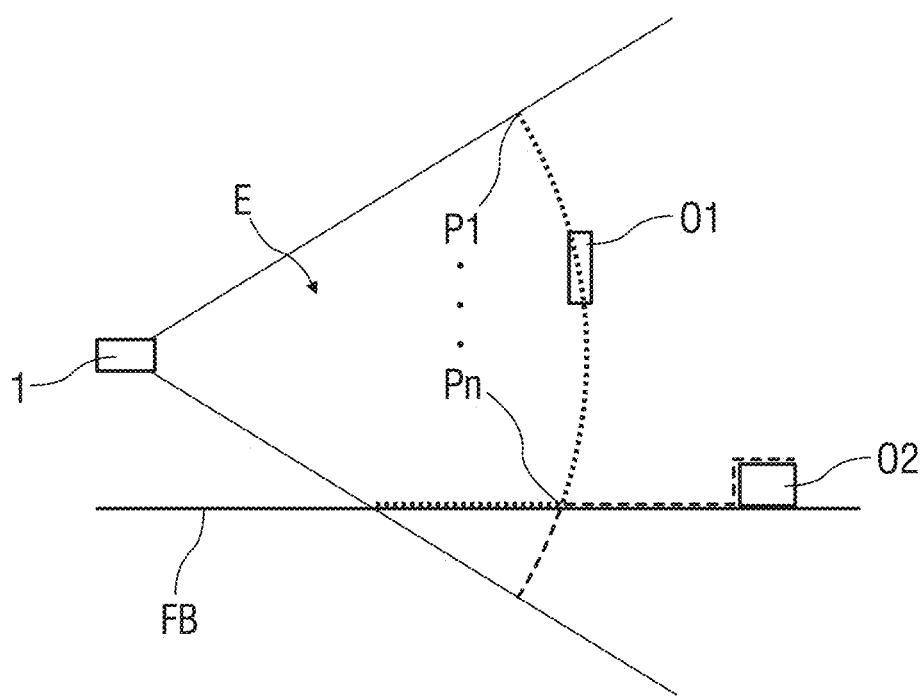

Exemplary embodiments of the invention relate to a method for the recognition of blooming in a lidar measurement, as well as to a device for the recognition of blooming in a lidar measurement having at least one lidar.

DE 10 2005 003 970 A1 discloses a method for determining functionality of a sensor arrangement on a motor vehicle, wherein a region captured by the sensor arrangement is divided into different sub-regions, and sensor signals allocated to one sub-region, from one particular surrounding area, are analyzed for determining the functionality of the sensor arrangement. Here, sensor signals, which are captured one after the other for different sub-regions when passing the particular surrounding area, are analyzed. The sub-regions are capture regions of different lidar sensors, or different angular sectors of a lidar sensor.

Furthermore, a method for the operation of an assistance system of a vehicle is known from DE 10 2018 003 593 A1, wherein the vehicle is moved in the autonomous driving mode by means of the assistance system, and the assistance system comprises an environment sensor, having a number of capture units arranged in and/or on the vehicle. In the autonomous driving mode of the vehicle, an environment of the vehicle, and objects located within it, are captured by means of the capture units, wherein a function of the individual capture units is constantly monitored by means of a monitoring module, and in the event of a failure of one of the capture units, exclusively an assistance function associated with this failed capture unit is deactivated by means of a planning module connected to the monitoring module. The capture units comprise a lidar-based sensor.

US 2019/0391270 A1 describes a reflection system for the improvement of an environmental observation by the use of a lidar in the presence of highly reflective surfaces. The reflection system comprises several processors and a memory that communicates with the processors. The reflection system further comprises a scanner module, having commands which, when they are executed by the processors, cause the processors, in reaction to determining that a first point cloud contains an observation of a concealed object which reflects strongly, to control an emission of a scanning light beam with a scanning intensity that is different from an initial intensity of an initial light beam, which is used for the capture of the first point cloud, and to dynamically control the lidar to capture a second point cloud that omits the concealed object. Furthermore, there is provision for an output module with commands which, when executed by the processors, cause the processors to generate a combined point cloud from the first point cloud and the second point cloud, which improves the observation of the environment when the lidar is used by reducing disturbances caused by the concealed object.

Exemplary embodiments of the present invention are directed to disclose a new method and a new device for the recognition of blooming in a lidar measurement.

In the method for the recognition of blooming in a lidar measurement, according to the invention, a distance to a lidar reflection point is determined in an active measurement and a passive measurement, wherein a first distance value is determined in the active measurement, based on a signal duration of a laser pulse, and a second distance value is determined in the passive measurement, based on a triangulation of two-dimensional intensity measurements carried out from different measuring positions. Blooming is then identified when the second distance value exceeds the first distance value by a pre-determined amount.

Here, a passive measurement by means of two-dimensional intensity measurements is understood as a capture of an environment by means of at least one lidar, in which the at least one lidar captures exclusively light radiation present in the environment, without the active emission of laser radiation.

Here, blooming is presently understood as an overexposure or crosstalk in a lidar measurement. Blooming occurs, for example, when a laser pulse emitted from a lidar is reflected from a strongly reflective target, for example from a road sign or a headlight reflector. In this case, a large amount of emitted energy is sent back to the lidar, in comparison with less reflective targets. The light beam sent back is not normally optimally focused. The reasons for this are manifold; it is often the case that the reflection from the target is not optimally reflecting, particles in the atmosphere deflect the laser beam, or soiling on a cover of the lidar causes light scattering. This can cause the light sent back to hit several receiver cells of the lidar which are located spatially near to one another, or the light sent back to transfer to neighboring pixels. The result of this is that—independent of the sensitivity of the detector—a distance measurement is triggered. Blooming effects are also normally stronger when they are shorter distances from the lidar because the amount of energy reflected by a target quickly diminishes with increasing distances which the light must cover.

Lidars play an important role in driver assistance systems, and other automatedly operated platforms, for example robots, because they enable an exact three-dimensional display of an environment of the lidar. When blooming occurs, however, it can lead to incorrect results in a measurement of distances between the lidar and objects captured in its environment. In particular, false-positive lidar measurements can occur as a result of blooming effects, such that the exact three-dimensional display of the environment is made more difficult.

By means of the method, a reliable identification of blooming in lidar measurements is easily possible, such that incorrect results in such distance measurements can be avoided, or at least certainly recognized. A safer operation of applications results from this, for example of automated, especially highly-automated or autonomous driving or moved vehicles and robots.

In a possible embodiment of the method, the passive measurement is based on two two-dimensional intensity measurements, wherein the first intensity measurement is carried out by means of a first lidar, and a second intensity measurement is carried out by means of a second lidar, arranged in a different position from the first lidar. This enables a simple and reliable execution of the passive measurement and, consequently, an especially reliable recognition of blooming.

In a further possible embodiment of the method, the two two-dimensional intensity measurements are carried out simultaneously, or chronologically one after the other. In particular when intensity measurements are carried out simultaneously, the passive measurement of the distance can be carried out very quickly.

In a further possible embodiment of the method, the passive measurement is based on two two-dimensional intensity measurements, wherein a first intensity measurement is carried out by means of a lidar located in a first position, and a second intensity measurement is carried out by means of the same lidar chronologically after the first measurement, and in a second position different from the first position. This enables a simple and reliable execution of the passive measurement and, consequently, an especially reliable recognition of blooming, wherein only one lidar is necessary for the execution of the two-dimensional intensity measurements, which leads to particularly low employment of hardware and costs.

In a further possible embodiment of the method, the passive measurement is executed by the evaluation of two-dimensional intensity images captured in the two-dimensional intensity measurements by means of a stereoscopic method. Such stereoscopic methods reliably determine the distance to a lidar reflection point, and thus to an object in the environment of the lidar.

In a further possible embodiment of the method, a semi-global matching algorithm is used as a stereoscopic method, by means of which the determination of the distance to a pixel in the two-dimensional intensity images, and thus to an object in the environment of the lidar, can be executed very reliably and especially precisely.

The device for the recognition of blooming in a lidar measurement comprises at least one lidar and, according to the invention, is characterized by a processing unit, which is suitable for determining a distance of the at least one lidar to a lidar reflection point in an active measurement and a passive measurement, to determine a first distance value in the active measurement, based on a signal duration of a laser pulse, to determine a second distance value in the passive measurement, based on a triangulation of two-dimensional intensity measurements, carried out from different measuring positions, and then to identify blooming when the second distance value exceeds the first distance value by a predetermined amount.

By use of the device, a reliable recognition of blooming in lidar measurements is easily possible, such that incorrect results in distance measurements executed by means of a lidar can be avoided, or at least certainly recognized. From this results a safer operation of applications, for example of automated, especially highly-automated or autonomous driving or moved vehicles and robots.

Exemplary embodiments of the invention are illustrated in more detail in the following with the assistance of drawings.

BRIEF DESCRIPTION OF THE DRAWING FIGURES

Figure 2:
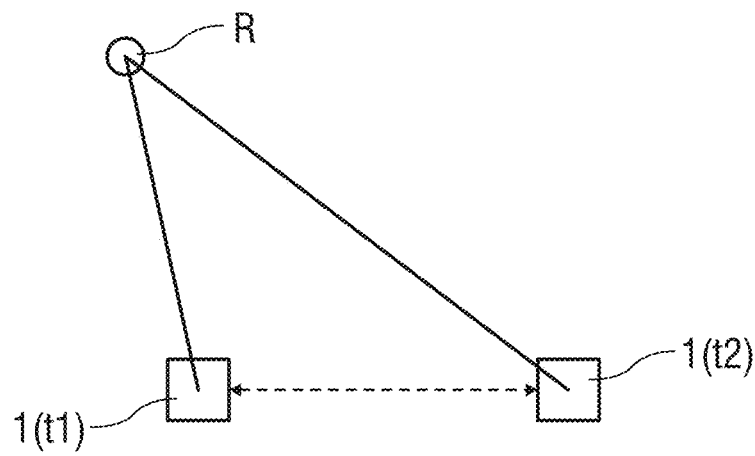
Figure 3:
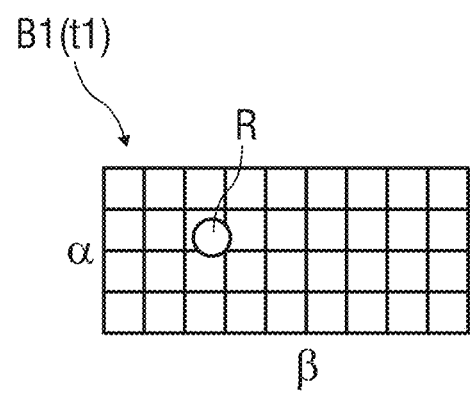
Figure 4:
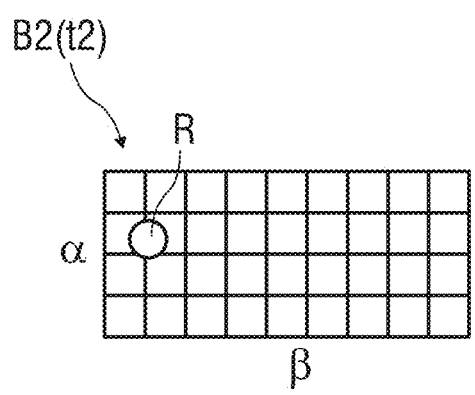
Figure 5:
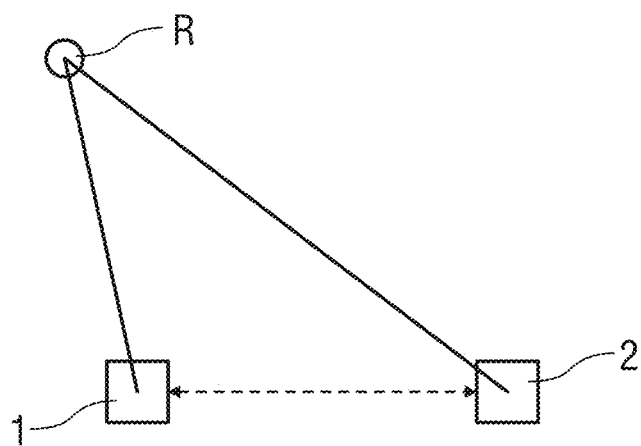
Figure 6:
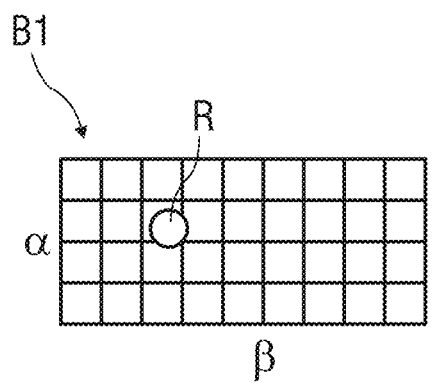
Figure 7:
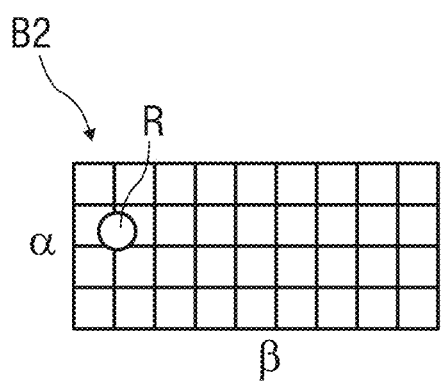

Shown are:

FIG. 1 schematically, an arrangement of a lidar, and an environment monitored by the lidar, FIG. 2 schematically, an arrangement of a lidar at different points in time, and an environment monitored by the lidar, FIG. 3 schematically, a lidar image captured by means of a lidar according to FIG. 2 at a first point in time, FIG. 4 schematically, a lidar image captured by means of a lidar according to FIG. 2 at a second point in time, FIG. 5 schematically, an arrangement of two lidars and an environment monitored by the lidars, FIG. 6 schematically, a lidar image captured by means of a first lidar according to FIG. 5 and FIG. 7 schematically, a lidar image captured by means of a second lidar according to FIG. 5.

Parts corresponding to one another are labelled in all figures with the same reference numerals.

DETAILED DESCRIPTION

In FIG. 1, an arrangement of a lidar 1, and an environment monitored by the lidar 1 is displayed.

Within the environment of the lidar 1 are located two objects O1, O2, which are captured by the lidar 1 within a capture region E.

The lidar 1 is, for example, arranged on an automated, especially highly automated or autonomously driving vehicle. The lidar 1 can alternatively be arranged on a robot.

The first object O1 is a highly reflective object O1, for example a road sign, for example a motorway sign arranged above a roadway FB. The second object O2 is located on the roadway, and has a certain level of reflectivity, for example also a lower or higher reflectivity than the first object O1.

By means of the lidar 1, distances to objects O1, O2 in its environment are determined by the emission of laser pulses and the measuring of a time until a reflected laser pulse hits a receiver of the lidar 1. Here, the lidar 1 can comprise several lasers and/or several receivers in order to increase a measuring rate and a spatial resolution of the lidar 1. Here, a measurement executed by lidar 1, also referred to as a scan, can be carried out in such a way that a complete scan can be interpreted as a two-dimensional measuring grid, also referred to as a lidar image.

In the displayed environment of the lidar 1, during the laser measurement, the first object O1, because of its high reflectivity, generates blooming points P1 to Pn above and below the object O1 at an equal distance, such that a so-called blooming artifact is created. If these blooming points P1 to Pn are not detected as such, the danger arises that, in a further computation, for example a sensor fusion, it is assumed that an obstacle, for example an end of a traffic jam, is located there, such that unwanted braking may be triggered by a driving assistance system in some cases.

FIG. 2 shows an arrangement of a lidar 1 at different points in time t1, t2, and an environment monitored by the lidar. In FIG. 3, a lidar image B1 captured by means of the lidar 1 according to FIG. 2 at a point in time t1 is displayed, and in FIG. 4, a lidar image B2, captured by means of the lidar 1 according to FIG. 2 at a second point in time t2 following the first point in time t1, is displayed. The lidar images B1, B2 here respectively display a two-dimensional measuring grid or a two-dimensional intensity image, whose axes show values of a vertical angle $\alpha$ and values of a horizontal angle $\beta$, such that the vertical angle $\alpha$ and the horizontal angle $\beta$ form image coordinates.

The lidar 1 is arranged on a self-moving platform, for example an automated, especially a highly automated or autonomously driving or moved vehicle or robot.

As described above, distances from objects O1, O2 are determined in the environment of the lidar by means of the lidar 1, by the emission of laser pulses and the measuring of a time until a reflected laser pulse hits a receiver of the lidar 1. Here, the reflection is generated at a lidar reflection point R, which belongs to the respective object O1, O2, for example to a so-called landmark.

Lidars 1 are normally considered active sensors, because, according to the description above, they need to actively emit energy to carry out a duration measurement, also known as a time-of-flight measurement. If the receiver of the lidar 1 is sensitive enough, this can also be used to measure an intensity of environmental light of the lidar 1 at a given wavelength of the lidar 1, which is backscattered to the lidar 1 without active illumination. In this way, by means of the lidar 1, it is possible to generate a highly dynamic greyscale image of a scene in a passive two-dimensional intensity measurement. Because of a markedly lower intensity of passively reflective light, no blooming effects occur in passive measurements of this kind. Such passive measurements can here be executed immediately before or immediately after the active measurement, such that a recorded scene shows almost no change between the two measurements. While the active measurement delivers an exact three-dimensional display of the environment of the lidar 1, the passive measurement enables a higher degree of detail for a two-dimensional aspect of an object O1, O2. In this way, both measuring principles can be supplemented.

The lidar 1, both displayed and arranged on the self-moving platform, is suitable both for carrying out an active measurement of distances from the lidar reflection point R, and for carrying out a passive measurement of intensities. Here, the passive measurement can be carried out either immediately before or immediately after the active measurement.

For determining blooming in a lidar measurement, a distance from the lidar reflection point R is determined in an active measurement and a passive measurement with the assistance of the data captured by the lidar 1, by a first distance value in the active measurement, based on a signal duration of a laser pulse from the lidar 1 to the lidar reflection point R and back to the lidar 1.

Subsequently, a second distance value is determined in the passive measurement, based on a triangulation of two-dimensional intensity measurements carried out from different measuring positions.

Blooming is then identified if the second distance value if the second distance value exceeds the first distance value by a pre-determined amount, especially where it is significantly larger than the first distance value.

Here, the passive measurement is based on two two-dimensional intensity measurements, wherein a first intensity measurement is carried out by means of the lidar 1 at the first point in time t1, located in a first position, and a second intensity measurement is carried out by means of the same lidar 1 at the second point in time t2, a point in time after the first measurement, and in a second position different from the first position. Between the two points in times t1, t2, a relative position of the lidar 1 to the lidar reflection point R changes as a result of the movement of the platform.

Here, a movement of the lidar 1 between two measurements is, for example, known by evaluating an inertial measuring unit, which is likewise arrayed on the moveable platform, and is calibrated to the lidar 1 or to a shared frame of reference.

An observation of characteristic positions, for example of landmarks, from different perspectives in a lidar image B1, B2, enables an execution of a three-dimensional re-construction of an observed scene. Because of the movement of the lidar 1, characteristic positions, and so an appurtenant lidar reflection point R, or a pixel recorded in a two-dimensional intensity image displaying it, can appear in different positions in the lidar images B1, B2, which were captured from different positions in the surrounding environment. This effect is generally described as a movement parallax. If the movement of the lidar 1 between the two points in times t1, t2 is known, and a position of one and the same lidar reflection point R is found in both lidar images B1, B2, then a three-dimensional position, and therefore a distance to the lidar reflection point R, can be reconstructed through simple triangulation.

For example, the passive measurement is carried out by evaluating the two two-dimensional intensity measurements by means of a stereoscopic method, for example of a semi-global matching algorithm.

A possible exemplary embodiment of a method for the recognition of blooming in a lidar measurement is described in the following.

Initially, a generally known stereo matching algorithm, for example a semi-global matching algorithm, is used to determine an angle displacement between each pixel in the passive lidar images B1, B2 that are captured from two different perspectives. For example, at point in time t1, the lidar 1 sees the reflection point R, or a pixel displaying it, in a vertical angle $\alpha$ of 10 degrees, and a horizontal angle $\beta$ of 5 degrees. At the point in time t2, the lidar 1 sees the reflection point R, or the pixel displaying it, in a vertical angle $\alpha$ of 10 degrees and a horizontal angle $\beta$ of 20 degrees.

As a three-dimensional movement of the lidar 1 between the capture of both lidar images B1, B2 is known, information about the corresponding position angles from the first and second measurement can be used to triangulate three-dimensional coordinates of the measured pixel position, namely of the lidar reflection point R.

A comparison of the active measurement at a random pixel site with the passive measurement, which has been derived from the triangulation described, now enables conclusions to be drawn about the presence of blooming. If the passive measurement derived with the structure-from-motion algorithm yields a significantly larger measurement than the active measurement, then blooming can be identified as a plausible explanation for this.

FIG. 5 shows an arrangement of two lidars 1, 2 and an environment monitored by the lidars 1,2. In FIG. 6, a lidar image B1 captured by means of a lidar 1 according to FIG. 5 is displayed, and in FIG. 7 a lidar image B2 captured by means of the other lidar 2 according to the lidar image captured at the same time is displayed. Here, the lidar images B1, B2 respectively represent a two-dimensional measuring grid or a two-dimensional intensity image, whose axes show values of a vertical angle $\alpha$ and a horizontal angle $\beta$, such that the vertical angle $\alpha$ and the horizontal angle $\beta$ form image coordinates.

Both lidars 1, 2 are arranged on a self-moving platform, for example on an automated, especially a highly automated or an autonomously driving or moved vehicle or robot. The lidars 1, 2 are also chronologically synchronized, such that these are designed to capture spatial angles of the same kind at the same time.

Both lidars 1, 2 are suitable both for executing an active measurement of distances from the lidar reflection point R, and for executing a passive measurement of intensities. Here, the passive measurement can be carried out immediately before or immediately after the active measurement.

For determining blooming in a lidar measurement, in this exemplary embodiment, a distance to the lidar reflection point R is determined in an active and passive measurement, with the assistance of data recorded by means of the lidar 1, 2, by determining a first distance value in the active measurement, based on a signal duration of a laser pulse from the lidar 1 and/or from the lidar 2 to the lidar reflection point R, and back to the lidar 1 and/or the lidar 2.

Subsequently, a second distance value is determined in the passive measurement based on a triangulation of two-dimensional intensity measurements carried out from different measuring positions.

Blooming is then identified when the second distance value exceeds the first distance value by a pre-determined amount, especially when it is significantly greater than the first distance value.

Extrinsic parameters of the lidars 1, 2, i.e., their positions and/or alignment, are known. For this purpose, the lidars 1, 2 are calibrated in relation to one another or to a shared frame of reference.

In contrast with the exemplary embodiment described in relation to FIGS. 2 to 4, this allows the passive measurement to be based on two two-dimensional intensity measurements, wherein a first intensity measurement is carried out by means of the first lidar, and the second intensity measurement is carried out by means of the second lidar 2, arranged in a different position from that of the first lidar 1.

The simultaneous recording of the scene from different perspectives by means of the lidars 1, 2 enables an observation of characteristic positions, for example of landmarks, in the lidar images B1, B2 from the different perspectives, and therefore an execution of a three-dimensional reconstruction of the observed scene. As a result of the different positions of the lidars 1, 2, characteristic positions, and therefore an appurtenant lidar reflection point R, or a pixel displaying it, can appear in different positions in the lidar images B1, B2, which have been captured from different environmental positions. As the relative position of the lidars 1, 2 in relation to each other and their extrinsic parameters are known, then if a position of one and the same lidar reflection point R, or of the pixel displaying it, can be found in both lidar images B1, B2, a three-dimensional position, and thus a distance from a lidar reflection point R, can be reconstructed by simple triangulation.

For example, the passive measurement is carried out by evaluation of the two intensity measurements by means of a stereoscopic method, for example a semi-global matching algorithm.

A possible exemplary embodiment of a method for the recognition of blooming in a lidar measurement is described in the following.

Firstly, a generally known stereo matching algorithm, for example a semi-global matching algorithm, is used to determine an angle displacement between each pixel in the passive lidar images B1, B2 that are recorded from two different perspectives. For example, the lidar 1 sees the lidar reflection point R, or a pixel displaying it, in a vertical angle α of 10 degrees, and a horizontal angle β of 5 degrees. The lidar 1 sees the lidar reflection point R, or the pixel displaying it, at the same time, for example in a vertical angle α of 10 degrees and a horizontal angle β of 20 degrees.

As a transformation between coordinate systems of both lidars 1 and 2 is known, information about the corresponding position angles is used with the passive intensity measurements executed by means of the lidars 1, 2 to triangulate three-dimensional coordinates of the measured pixel position, i.e., of lidar reflection point R.

A comparison of the active measurement at a random pixel site with the passive measurement, which has been derived from the triangulation described, now enables conclusions to be drawn about the presence of blooming. If the passive measurement yields a significantly larger distance than the active measurement, then blooming can be identified as a plausible explanation for this.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Lidar
2 Lidar
B1 Lidar image
B2 Lidar image
E Capture region
FB Roadway
O1 Object 1
O2 Object 2
P1 to Pn Blooming point
R Lidar reflection point
t1 Point in time
t2 Point in time
α Angle
β Angle

The invention claimed is:

1. A method for recognizing blooming in a lidar measurement, the method comprising:
   determining a distance to a lidar reflection point using an active measurement and a passive measurement, wherein the determined distance includes a first distance value determined in the active measurement based on a signal duration of a laser pulse, and wherein the determined distance includes a second distance value determined in the passive measurement based on a triangulation of two-dimensional intensity measurements performed from different measuring positions; and
   identifying blooming in the lidar measurement when the second distance value exceeds the first distance value by a predetermined amount.

2. The method of claim 1, wherein
   the passive measurement is based on first and second two-dimensional intensity measurements,
   the first two-dimensional intensity measurement is performed by a first lidar; and
   the second two-dimensional intensity measurement performed by a second lidar arranged in a different position from the first lidar.

3. The method of claim 2, wherein the first and second passive two-dimensional intensity measurements performed simultaneously or chronologically one after the other.

4. The method of claim 1, wherein
   the passive measurement is based on first and second two-dimensional intensity measurements,
   the first two-dimensional intensity measurement is performed by a lidar located in a first position, and
   the second two-dimensional intensity measurement is performed by the same lidar at a point in time after the first measurement and in a second position that is different from the first position.

5. The method of claim 2, wherein the passive measurement is performed using a stereoscopic method to evaluate two-dimensional intensity images captured by the first and second two-dimensional intensity measurements.

6. The method of claim 5, wherein the stereoscopic method involves a semi-global matching algorithm.

7. A device for recognizing blooming in a lidar measurement, the device comprising:

at least one lidar; and a processing unit configured to determine a distance to a lidar reflection point using an active measurement and a passive measurement, wherein the determined distance includes a first distance value determined in the active measurement based on a signal duration of a laser pulse, and wherein the determined distance includes a second distance value determined in the passive measurement based on a triangulation of two-dimensional intensity measurements performed from different measuring positions; and identify blooming in the lidar measurement when the second distance value exceeds the first distance value by a predetermined amount.

* * * * *